United States Patent
Koller et al.

[11] 3,872,132
[45] Mar. 18, 1975

[54] PROCESS FOR THE MANUFACTURE OF SIGNAL DYES OF THE CATIONIC SERIES

[75] Inventors: Stefan Koller, Pratteln; Rudolf Zink, Oberwil Basel-land; Dieter Reichel, Kuessnacht am Rigi; Jacques Voltz, Riehen, all of Switzerland

[73] Assignee: Ciba-Geigy AG, Basel, Switzerland

[22] Filed: Aug. 23, 1971

[21] Appl. No.: 174,156

[30] Foreign Application Priority Data
Aug. 26, 1970  Switzerland................ 12749/70

[52] U.S. Cl......... 260/296 B, 8/177 AB, 260/247.1, 260/268 H, 260/288 R, 260/293.8, 260/294.8 C, 260/294.8 E, 260/295 F, 260/297 B
[51] Int. Cl.............................................. C07d 7/34
[58] Field of Search...... 260/294.8 C, 295 F, 270 R, 296 B, 247.1, 293.8, 268 H

[56] References Cited
UNITED STATES PATENTS
3,014,041  12/1961  Hausermann et al............. 260/304
3,201,406  8/1965   Moffett............................ 260/295
3,704,302  11/1972  Sigeharu et al................. 260/343.2 R X Primary Examiner—John D. Randolph
Attorney, Agent, or Firm—Wenderoth, Lind & Ponack

[57] ABSTRACT

A process for the manufacture of fluorescent cationic compounds of the 1,2-pyran series of the formula I (I)

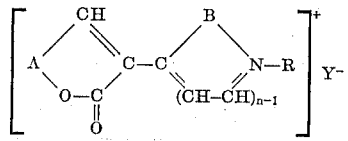

in which
A represents a bivalent aromatic residue which is linked in the o-position and may, if desired, be substituted,
B represents a bivalent residue which completes the nitrogenous Q ring to an azine ring which may be substituted or condensed with further rings,
R represents an alkyl or aralkyl residue which, if desired, may be substituted,
$n$ is 1 or 2, and
Y represents the equivalent charge of an anion,
wherein a thioacetamide compound of the formula II (II)

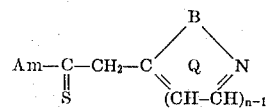

in which
A$m$ represents a primary, secondary or tertiary amino group and
B and $n$ have the same meanings as in formula I
is converted with a reactive ester of an aliphatic or araliphatic alcohol with an inorganic or organic acid of the formula $$R - Y'$$

(III)

(in which R has the same meaning as in formula I and Y' represents the acid residue corresponding to the anion Y$^-$) into a cycloammonium compound which latter is then reacted with an aromatic aldehyde, which contains a hydroxyl group in the orthoposition to the aldehyde group, to form a cationic coumarin compound of the formula I, and the starting materials are chosen so that the cationic portion of the final product does not contain any groups that undergo acid dissociation in water.

8 Claims, No Drawings

PROCESS FOR THE MANUFACTURE OF SIGNAL DYES OF THE CATIONIC SERIES

Signal dyes are being used on an ever increasing scale. Articles dyed with signal dyes, especially clothing articles, are very important, for example for the ever denser traffic to identify children on their way to and from school, cycles on the rod or workmen while repairing roads. In marine uses there come further into consideration, for example, lifejackets and inflatable rafts and in the sea and air traffic (airports) markers such as buoys, but this enumeration still does not deal exhaustively with the possible uses. For many purposes orange signal dyes are preferred.

The present invention provides a new process for the manufacture of cationic compounds of the 1,2-pyran series which are substituted by an N-quaternated azine ring in the 3-position of the pyran ring and which are luminous orange signal dyes.

According to the hitherto used process for the manufacture of certain cationic coumarin compounds, which contain in the 3-position a quaternary cycloammonium group, more especially an azolium group, a coumarin compound — which has been obtained by aldol condensation of an aromatic ortho-hydroxy-aldehyde compound with an azole compound that contains in position 2 a cyanomethyl or an esterified carboxymethyl group — is subsequently quaternated and then the pyrone ring is closed.

However, according to the said process no cationic coumarin compound containing an azinium group in position 3 is accessible on an industrial scale because azine compounds containing in position 2 or 4 a cyanomethyl group or an esterified carboxylmethyl group are very difficult to prepare and are often not sufficiently stable. Thus, for example, pyridylacetic acid decarboxylates very readily, while pyridylacetonitrile is sensitive towards oxidation. Furthermore, for example, ethylpyridylacetate can be manufactured from picoline by the method of H. Zimmer and D. George (see Berichte der deutschen chemischen Gesellschaft, volume 89, page 2,285 [1956]), but the yield obtained by this method is only moderate and in view of the extreme flammability of pycolyl lithium this method cannot be used on an industrial scale.

Azine compounds that contain a thioacetamide group can be manufactured in a very simple manner but they are unsuitable for the above-mentioned synthesis because the methylene group is too little activated by the thioamide group.

The present invention provides a process according to which the readily accessible thioacetamides of azine compounds furnish in a single reaction stage and in good yields fluorescent cationic compounds of the formula I (I) 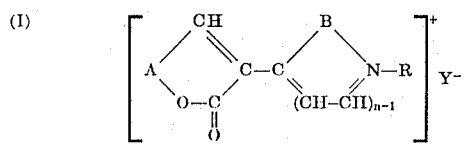

in which:

A represents a bivalent aromatic residue which is linked in the o-position and may, if desired, be substituted, B represents a bivalent residue which completes the nitrogenous ring Q to an azine ring which may be substituted or condensed with further rings, R represents an alkyl or aralkyl residue which, if desired, may be substituted, $n$ is 1 or 2, and Y represents the equivalent charge of an anion.

The cationic coumarin compounds obtained by the very economical process described above are very pure and do not require purification.

According to the present process a thioacetamide compound of the formula II (II) 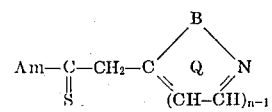

in which

A$m$ represents a primary, secondary or tertiary amino group and

B and $n$ have the same meanings as in formula I, is converted with a reactive ester of an aliphatic or araliphatic alcohol with an inorganic or organic acid of the formula III $$R - Y'$$

(III)

(in which R has the same meaning as in formula I and Y' stands for the acid residue corresponding to the anion Y⁻) into a cycloammonium compound which latter is then reacted with an aromatic aldehyde, which contains a hydroxyl group in ortho-position to the aldehyde group, to form a cationic coumarin compound of the formula I, the starting compounds being chosen so that the cationic portion of the final product contains a group that undergoes acid dissociation in water.

It is surprising and could not have been expected that the process of this invention leads directly to a coumarin compound and not to a thiocoumarin compound.

The term "groups that undergo acid dissociation in water and are excluded from the cationic portion of the compounds of the formula I manufactured by the present process" describes in this context and hereinafter the known substituents that impart an anionic character to the compounds, for example sulphonic acid, carboxylic acid and phoshporic acid groups.

The thioacetamide compounds of the formula II to be used as starting materials in the present process are accessible in a simple manner, for example by reacting a vinyl compound of the formula IV (IV) 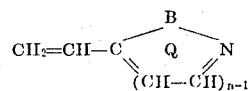

where B and $n$ have the same meanings as in formula I, with ammonia or a primary or secondary amine in the presence of sulphur.

The nitrogenous ring Q in formulae I, II and IV represents an azine ring which, if desired, may be substituted or condensed with further rings, advantageously with carbocyclic aromatic rings, for example with a possibly substituted benzene ring.

When $n = 1$, the completing bivalent residue B may be, for example, the butadienylene residue —CH=CH—CH=CH— or the styrylene residue

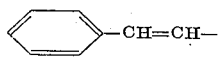

linked in ortho-position to the vinylene group. In these groups the residue B completes a pyridine or quinoline ring linked in the 2-position to the coumarin residue.

When $n = 2$, the residue B may be, for example, the vinylene or the ortho-phenylene residue. In such a case the residue B completes a pyridine or quinoline ring linked in the 4-position.

By definition the azine ring Q, as well as any aromatic ring possibly condensed with it may, if desired, be further substituted. Appropriate ring substituents are, for example halogens such as chlorine or bromine, lower alkyl groups or lower alkoxy groups.

In particularly readily accessible compounds of the formulae I and II $n = 2$ and B stands for a bivalent residue which completes the nitrogenous ring Q to a pyridine ring linked in the 4-position. This pyridine ring may be further substituted, especially by methyl groups.

vinyl compounds of the formula IV suitable for use in the manufacture of the thioacetamides of the formula II are, for example, 2-vinylpyridine, 4-vinylpyridine, 2-vinylquinoline, 2-vinyl-5- or -6-methylpyridine, 2-methyl-4-vinylpyridine, 4-vinylquinoline or 2-methyl-4-vinylquinoline.

Primary and secondary amines suitable for the reaction with the vinyl compounds of the formula IV are lower mono- and dialkylamines such as methylamine, dimethylamine, ethylamine, diethylamine, n-propylamine, isopropylamine, n-butylamine, secondary butylamine, dipropylamine and dibutylamine; cyclohexylamine, dicyclohexylamine, benzylamine and dibenzylamine; N-lower alkyl-N-phenylamines such as N-methyl- or N-ethyl-N-phenylamine and more especially secondary heterocyclic amines such as pyrrolidine, piperidine, morpholine and N-lower alkyl-piperazines such as N-methylpiperazine. The amine of choice is morpholine.

Accordingly, thioacetamine compounds of the formula II, in which A$m$ represents a morpholine group, are preferably used in the process of this invention.

Reactive esters of the formula III, which are suitable for converting the thioacetamides of the formula II into cycloammonium compounds, are, for example, possibly substituted alkyl esters or aralkyl esters of a hydrogen halide, for example the methyl, ethyl, n-propyl, n-butyl, β-cyanoethyl, β-carbamoylethyl or benzyl esters of hydrogen chloride, hydrogen bromide or hydrogen iodide; the dialkyl sulphates such as dimethyl or diethyl sulphate; the alkyl esters of an organic sulphonic acid such as the methyl, β-chloroethyl, ethyl or butyl ester of benzenesulphonic or para-toluene-sulphonic acid; furthermore the alkyl esters of bromo- or chloroacetic acid (containing an alkyl residue preferably containing one to four carbon atoms). Instead of certain substituted alkanol esters their pre-products may be used, for example instead of β-cyanoethyl- or β-carbamoylethyl-chloride or -bromide there may be used acrylonitrile or acrylamide, also alkylene oxides such as propylene oxide, epichlorohydrin or epibromohydrin, in the presence of hydrogen chloride or bromide or glacial acetic acid. However, dimethylsulphate or diethylsulphate is the preferred quaternating agent.

The reaction of a thioacetamide compound of the formula II with an ester of the formula III to yield the cycloammonium compound is advantageously performed by heating the two reactants at a temperature within the range from 20° to 150° C in an organic solvent that does not participate in the reaction. Appropriate solvents are, for example, possibly halogenated or nitrated aromatic hydrocarbons, for example toluene, a xylene, a halogenobenzene or nitrobenzene, a possibly halogenated aliphatic hydrocarbon, for example chloroform, trichloroethylene, tetrachloroethylene, tetrachloroethane or trichloroethane, or a water-miscible organic solvent, especially an aliphatic or cycloaliphatic ketone such as acetone, methylethylketone, methylisobutylketone or cyclohexanone; an alkanol of medium high molecular weight such as propanol, isopropanol, a butanol or an amylalcohol; also dioxane, dimethyl sulphoxide, tetrahydrofurane, methylpyrrolidone and dimethylformamide. It is advantageous to perform the reaction in the presence of an acid acceptor, for example sodium or potassium acetate, or calcium, sodium or potassium carbonate or magnesium oxide.

Aromatic aldehyde compounds suitable for use in the present process are in the first place those of the benzene or naphthalene series. Apart from the aldehyde group and the hydroxyl group required by definition the aromatic ring may further contain nonionic substituents, for example halogens such as fluorine, chlorine or bromine, or cyano or nitro groups, lower alkyl or lower alkoxy groups, or possibly substituted amino groups.

Suitable for use in the process of this invention are aromatic aldehyde compounds that contains a hydroxyl group in ortho-position to the aldehyde group, and these aldehyde compounds may, if desired, be substituted in the 4-position by a lower alkoxy group, a lower alkanolyamino, a lower alkoxycarbonylamino group, or by a primary, secondary or preferably tertiary amino group.

Especially valuable fluoroescent dyes are obtained by the process of this invention by using aromatic aldehyde compounds of the formula V (V) 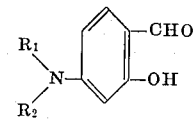

in which
R$_1$ represents a lower, possibly substituted, alkyl group, a cycloalkyl group, a phenylalkyl or phenyl group,
R$_2$ represents a lower alkyl group or
R$_1$ and R$_2$, in conjunction with the nitrogen atom which links them together, possibly with inclusion of further hetero atoms, represent a heterocyclic residue.

When $R_1$ and $R_2$ stand for lower alkyl groups, they may be, for example, the methyl, ethyl, isopropyl or butyl group.

When $R_1$ represents a substituted lower alkyl group, it may be substituted, for example, by a halogen such as chlorine or bromine, or by the cyano or hydroxyl group. Examples of such substituted alkyl groups are the β-chloroethyl, β-bromoethyl, β-cyanoethyl, β-hydroxyethyl, β- or γ-hydroxypropyl or β,γ-dihydroxypropyl group.

When $R_1$ represents a cycloalkyl group or a phenylalkyl group, it may be, for example, the cyclohexyl or the benzyl group respectively.

When $R_1$ and $R_2$ in conjunction with the common nitrogen atom represent a heterocyclic residue, the latter preferably contains five or six cyclic members and it may be, for example, the pyrrolidine or piperidine ring and, if the heterocycle contains a further hetero atom, for example, the morpholine ring.

Preferably, $R_1$ and $R_2$ are identical and represent a lower alkyl group, especially the methyl or ethyl group, each.

The term "lower" used here in connection with "alkyl", "alkoxy," "alkanoyl" and "alkoxycarbonyl" indicates that the group concerned contains no more than four, especially one or two, or two or three, carbon atoms. Examples of aldehyde compounds suitable for use as starting materials are:

Salicylaldehyde, 4-methoxy-2-hydroxy-benzaldehyde, 4-ethoxy-2-hydroxy-benzaldehyde, 4-acetylamino-2-hydroxy-benzaldehyde, 4-ethoxycarbonylamino-2-hydroxy-benzaldehyde, 4-dimethylamino-2-hydroxy-benzaldehyde, 4-diethylamino-2-hydroxy-benzaldehyde, 4-(N-β-hydroxyethyl-N-ethylamino)-2-hydroxy-benzaldehyde, 4-(N-β-cyanoethyl-N-ethylamino)-2-hydroxy-benzaldehyde, 4-(N-phenyl-N-methylamino)-2-hydroxy-benzaldehyde, 4-(N-benzyl-N-ethylamino)-2-hydroxy-benzaldehyde, 4-(1'-piperidino)-2-hydroxy-benzaldehyde and 4-(1'-morpholino)-2-hydroxy-benzaldehyde.

According to an advantageous mode of reacting the cycloammonium compound with the aromatic aldehyde compound the latter is added to the reaction medium in which the cycloammonium compound is prepared and the reaction mixture is then heated at a temperature ranging from 40° to 200° C, preferably from 60° to 120° C. Referred to the cycloammonium compound an at least equimolecular proportion of the aldehyde compound should be used. It is advantageous to add a proton acceptor to the reaction mixture. such proton acceptors are, for example, alkaline earth metal oxides such as magnesium oxide or barium oxide; ammonium salts or alkali metal salts of weak organic or inorganic acids such as ammonium acetate, sodium acetate, potassium acetate, potassium hydrogencarbonate, potassium carbonate, sodium carbonate or di- or trisodium phosphate.

The cationic coumarin compounds of the formula I are obtained in the form of salts of the acids of the alkanol esters or aralkanol esters of the formula III used in their manufacture, that is to say in the form of salts of inorganic or organic acids. Accordingly, the final products are in the first place halides such as chlorides, bromides or iodides, or alkylsulphates such as methosulphates or ethosulphates, benzenesulphonates or para-toluenesulphonates. If desired, also salts of other acids may be prepared by double reaction in an appropriate polar solvent, for example oxalates by adding oxalic acid. It is also possible to manufacture double salts, for example with a coumarin halide and an appropriate zinc halide.

The precipitation of the coumarin salt formed is advantageously completed by adding sodium chloride and/or zinc chloride in an aqueous acid solution, whereupon the precipitated salt is filtered off.

The N-quaternary 3-heterocyclically substituted coumarin compounds of the formula I manufactured according to this invention are new. They are soluble in organic solvents such as an alcohol, ester or ketone and — especially when obtained in the form of a salt with a strong inorganic acid or organic sulphonic acid — they are also readily soluble in water. The solutions of these cationic compounds display a strong fluorescence in ultraviolet light and in daylight.

The new cationic coumarin compounds of the formula I are also accessible by the afore-mentioned conventional method by reacting a coumarin compound of the formula VI (VI) 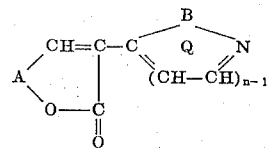

in which A, B and $n$ have the same meanings as in formula I, with a reactive ester of the formula III shown above.

The reaction of a coumarin compound of the formula VI with an ester of the formula III to yield the cycloammonium compound of the formula I is advantageously performed by heating the two reactants in an organic solvent, which is inert towards the reaction, as listed above.

Depending on their composition coumarin compounds of the formula I obtained by the present process may be used for optically brightening man-made fibres or synthetic materials or for dyeing them fluorescent shades.

Coloured, water-soluble salts obtained by the present process, especially those of the formula VII (VII) 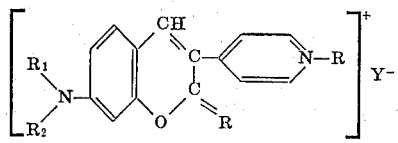

in which R and Y have the same meanings as in formula I and $R_1$ and $R_2$ have the same meanings as in formula V, deposit extensively or completely from an aqueous, neutral or weakly acidic solution, if desired in the presence of a dispersing wetting agent, as in the presence of a condensate of an alkylene oxide with a soluble alkanol, on synthetic, acid-modified fibrous material on being heated in air or in a closed dye vat under pressure, and produce on such material a pure, fluorescent yellow to red shade which is fast to washing, decatising and light.

Furthermore, in combination with known cationic dyestuffs, the cationic coumarin dyestuffs prepared according to this invention are suitable for complementing especially luminous combination dyeings.

A synthetic acid-modified fibrous material, which is suitable for dyeing or printing with the cationic coumarin dyestuffs obtained by the present process, is, for example, an acid-modified polyamide such as a polycondensate from a 4,4'-diamino-2,2'-diphenyldisulphonic acid or a 4,4'-diamino-2,2'-diphenylalkanedisulphonic acid with a polyamide-forming starting material; a polycondensate from a monoaminocarboxylic acid or an amide-forming derivative thereof or a dibasic carboxylic acid and a diamine with an aromatic dicarboxylsulphonic acid, for example a polycondensate from caprolactam or hexamethylene diammonium adipate with potassium-3,5-dicarboxybenzenesulphonate; or acid-modified polyester fibres such as a polycondensate from an aromatic polycarboxylic acid, for example terephthalic acid or isophthalic acid, with a polyhydric alcohol, for example ethyleneglycol and 1,2- or 1,3-dihydroxy-3-(3-sodiumsulphopropoxy)-propane, 2,2-dimethylol-1-(3-sodium-sulphopropoxy)-butane, 2,2-bis-(3-sodium-sulphopropoxyphenyl)-propane or 3,5-dicarboxybenzenesulphonic acid or sulphonated terephthalic acid, sulphonated 4-methoxy-benzenecarboxylic acid or sulphonated diphenyl-4,4'-dicarboxylic acid.

However, a preferred fibrous material is one prepared from polyacrylonitrile or from polyacrylonitrile copolymer. If the material to be dyed is a polyacrylonitrile copolymer, the share of acrylonitrile in it is preferably at least 80 percent of the weight of the copolymer. Apart from acrylonitrile the comonomer normally used is another vinyl compound, for example vinylidene chloride, vinylidene cyanide, vinyl chloride, a methacrylate, methylvinylpyridine, N-vinylpyrrolidone, vinyl acetate, vinyl alcohol or a styrenesulphonic acid.

EXAMPLE 1

A solution of 44 g of 4-pyridyl-thioacetylmorpholide of the formula

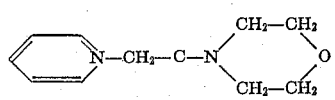

in 150 g of isopropanol is mixed with 16.4 g of anhydrous sodium acetate, whereupon 76 g of dimethylsulphate are added dropwise within 5 minutes. The resulting brownish red solution is then mixed with 38.6 g of 4-diethylamino-2-hydroxy-benzaldehyde. The reaction mixture is refluxed for 2 hours, then poured into 2 litres of water and adjusted to a pH value of 4.5 by adding an aqueous sodium acetate solution. The coumarin compound thus formed is then precipitated in the form of the zinc chloride double salt by adding sodium chloride and zinc chloride; it is filtered off, washed with a sodium chloride solution and dried at 60° to 70° C under vacuum.

The resulting dyestuff of the formula

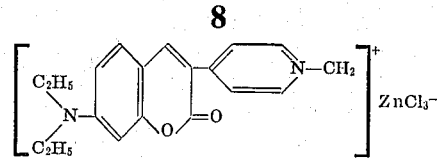

dyes polyacrylonitrile fibres from an acetic acid dyebath luminous orange shades. The dyeings are fast to washing, decatising and light.

The 4-pyridylthioacetylmorpholide used in this example may be prepared as follows:

19.2 Grams of morpholine is tipped into a suspension of 12.8 g of sublimed sulphur in a mixture of 21 g of 4-vinylpyridine and 50 g of chlorobenzene. The exothermic reaction is allowed to subside and the temperature is then maintained for 2 hours at 135° – 140° C. The batch is then cooled to 5° C and the precipitate filterd off, washed with a small quantity of chlorobenzene and dried at 60° – 70° C under vacuum, to yield 31 g of 4-pyridylthioacetylmorpholide melting at 105° – 107° C.

EXAMPLE 2

23.4 Grams of 4-pyridyl-thioacetylcyclohexylamide of the formula

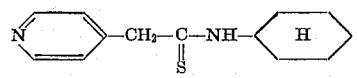

are suspended at 60° C in 100 ml of isopropanol, and this suspension is mixed with 8.2 g of anhydrous sodium acetate, whereupon 38 g of dimethylsulphate are added dropwise within 5 minutes. The temperature is then maintained for 5 minutes at 65° – 70° C and 19.3 g of 4-diethylamino-2-hydroxybenzaldehyde is tipped into the resulting solution. The reaction mixture is refluxed for 1½ hours at 75° – 80° C, then poured into 1 litre of water and adjusted to a pH value of 4.5 by adding an aqueous sodium acetate solution. The coumarin compound thus formed is precipitated in the form of the zinc chloride double salt by means of sodium chloride and zinc chloride. This double salt is filtered off, washed with a solution of sodium chloride and dried at 60° – 70° C under vacuum. The resulting product is identical with the dyestuff obtained as described in Example 1.

The 4-pyridylthioacetylcyclohexylamide used in this example is obtained in the following manner:

54.5 Grams of cyclohexylamine are added at 20° C to a mixture of 50 ml of chlorobenzene, 52.5 g of 4-vinylpyridine and 32 g of sulphur. During the ensuing exothermic reaction the temperature rises to 90° – 100° C and after it has subsided the temperature is maintained at 135° C for 30 minutes. The reaction mixture is then allowed to cool to room temperature and the precipitate formed is filtered off and dried at 60° – 70° C under vacuum, to yield 70 g of 4-pyridylthioacetylcyclohexylamide which, after recrystallisation from chlorobenzene, melts at 194° – 195° C.

When 4-pyridylthioacetylmorpholide or -cyclohexylamide is replaced by an equivalent quantity of one of the thioacetamide compounds shown in column II of the following Table, and dimethylsulphate is replaced by an equivalent quantity of one of the alkylating agents listed in column III, and 4-diethylamino-2-hydroxybenzaldehyde by an equivalent quantity of a 4-amino-2-hydroxybenzaldehyde compound shown in IV of this Table, all other conditions being identical to those indicated in Example 1 or 2, dye salts are obtained which produced on polyacrylonitrile fibres dyeings having similarly good properties; these shades are shown in the last column of the Table.

TABLE

| I | II | | III | IV | | V |
|---|---|---|---|---|---|---|
| | W—CH$_2$—C(=S)—Am | | | R$_1$R$_2$N—C$_6$H$_3$(OH)—CHO | | |
| Example number | W | Am | Alkylating agent | R$_1$ | R$_2$ | Shade of polyacrylonitrile fibres |
| 2 | pyridyl | —N(morpholino) | Dimethyl sulphate | —CH$_3$ | —CH$_3$ | Brilliant yellow. |
| 3 | CH$_3$-pyridyl | Same as above | do | —C$_2$H$_5$ | —C$_2$H$_5$ | Do. |
| 4 | pyridyl | do | Diethyl sulphate | —C$_2$H$_5$ | —C$_2$H$_5$ | Do. |
| 5 | CH$_3$-pyridyl | do | Dimethyl sulphate | —C$_2$H$_5$ | —C$_2$H$_5$ | Do. |
| 6 | pyridyl | do | do | —C$_2$H$_5$ | —C$_2$H$_5$ | Do. |
| 7 | pyridyl | —N(C$_4$H$_9$)$_2$ | Diethyl sulphate | —CH$_3$ | —CH$_3$ | Brilliant orange. |
| 8 | Same as above | —N(morpholino) | Benzyl chloride | —CH$_3$ | —CH$_3$ | Do. |
| 9 | do | Same as above | Dimethyl sulphate | —CH$_2$CH$_2$OH | —C$_2$H$_5$ | Do. |
| 10 | do | morpholino | do | —CH$_2$CH$_2$CN | —C$_2$H$_5$ | Do. |
| 11 | C$_2$H$_5$-pyridyl | —N(piperazino)N—CH$_3$ | do | C$_2$H$_5$ | —C$_2$H$_5$ | Brilliant yellow. |
| 12 | Same as above | —N(CH$_3$)$_2$ | do | —CH$_3$ | —CH$_3$ | Do. |
| 13 | pyridyl | —N(morpholino) | do | Morpholino | | Brilliant orange. |
| 14 | Same as above | Same as above | do | —CH$_2$—C$_6$H$_5$ | —C$_2$H$_5$ | Do. |
| 15 | do | do | do | —C$_6$H$_5$ | —CH$_3$ | Do. |
| 16 | do | do | —Br—CH$_2$CH$_2$CONH$_2$ | —CH$_3$ | —CH$_3$ | Do. |
| 17 | quinolyl | do | Dimethyl sulphate | —C$_2$H$_5$ | —C$_2$H$_5$ | Brilliant scarlet. |

Table – Continued

| Example number | II W (in W—CH$_2$—C(=S)—Am) | Am | Alkylating agent | R$_1$ | R$_2$ | Shade of polyacrylonitrile fibres |
|---|---|---|---|---|---|---|
| 18 | 4-quinolyl | ....do.... | ....do.... | —C$_2$H$_5$ | —C$_2$H$_5$ | Red. |
| 19 | 4-pyridyl | ....do.... | Br—CH$_2$CH$_2$COOC$_2$H$_5$ | —CH$_3$ | —CH$_3$ | Brilliant orange. |
| 20 | Same as above | —NHCH$_2$—C$_6$H$_5$ | Dimethyl sulphate | —CH$_2$CH$_2$Cl | —C$_2$H$_5$ | Do. |
| 21 | ....do.... | —N(morpholino) | Br—CH$_2$—CH(OH)—CH$_3$ | —CH$_3$ | —CH$_3$ | Do. |
| 22 | ....do.... | —NH$_2$ | Diethyl sulphate | —CH$_2$—C$_6$H$_5$ | —CH$_3$ | Do. |
| 23 | ....do.... | —NH—CH$_2$CH(CH$_3$)$_2$ | ....do.... | —CH$_3$ | —CH$_3$ | Do. |

EXAMPLE 24

8.2 Grams of sodium acetate are added to a solution of 22 g of the 4-pyridylthioacetylmorpholide prepared as described in Example 1 in 80 g of isopropanol and while cooling the mixture 38 g of dimethyl sulphate are added dropwise. Then 12.2 g of salicylaldehyde are added, the reaction mixture is heated for 90 minutes at 65° – 70° C and then poured into 500 ml of water. The basic coumarin compound thus formed is precipitated as the double salt of the formula

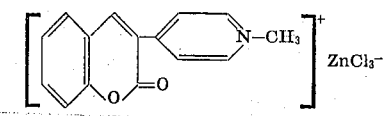

by adding 15 g of zinc chloride and 100 g of sodium chloride; an aqueous solution of this double salt displays a blue fluorescence in ultraviolet light.

When in this example 12.2 g of salicylaldehyde is replaced by 15.2 g of 4-methoxy-2-hydroxybenzaldehyde or by 16.6 of 4-ethoxy-2-hydroxybenzaldehyde or by 17.2 g of 2-hydroxy-1-naphthaldehyde or by 17.9 g of 4-acetylamino-2-hydroxybenzaldehyde, all other conditions being identical, there result the respective zinc chloride double salts of 3-(1'-methylpyridyl-4')-7-methoxycoumarin, 3-(1'-methylpyridyl-4')-7-ethoxycoumarin, 3-(1'-methylpyridyl-4')-5,6-benzocoumarin and 3-(1'-methylpyridyl-4')-7-acetylaminocoumarin which display similar fluorescence properties.

EXAMPLE 25

14.7 Grams of 3-pyridyl-(4')-7-diethylaminocoumarin are dissolved at 60° C in 130 ml of chlorobenzene. The resulting solution is mixed with 8 g of dimethylsulphate, which causes the temperature to rise to 80° C. The reaction mixture is kept for 15 minutes at this temperature and then cooled to 10° C, whereupon the dyestuff of the formula

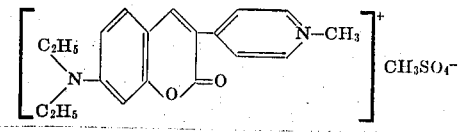

precipitates; it is filtered off, washed with petroleum ether and dried at 60° – 70° C under vacuum.

The resulting dye salt dyes polyacrylonitrile fibres from an acetic acid dyebath luminous and brilliant orange shades. The dyeings are fast to washing, decatising and light.

The 3-(pyridyl-(4')-7-diethylaminocoumarin used in the above example is prepared by condensing 4-pyridylacetonitrile with 4-diethylamino-2-hydroxybenzaldehyde in methanol in the presence of piperidine and subsequently boiling the coumarinimide formed with dilute hydrochloric acid.

Dyeing instruction

5 Grams of the dyestuff prepared as described in Example 1 are pasted with 2 g of acetic acid of 40 percent strength and dissolved by adding 4 kg of hot water. Then 1 g of sodium acetate and 2 g of an adduct, quaternated with dimethylsulphate, of 15 to 20 equivalents of ethylene oxide with N-octadecyldiethylenetriamine are added and 100 g of polyacrylonitrile fabric is immersed in this bath at 60° C. The bath is heated to 100° C within 30 minutes and dyeing is then performed for 90 minutes at the boil. The liquor is then allowed to cool to 60° C within 30 minutes. The material dyed in this manner is then taken out and rinsed with lukewarm and with cold water.

The resulting pure, luminous orange dyeing of the polyacrylonitrile material is fast to light, decatising and washing.

What we claim is:

1. A process for the manufacture of fluorescent cationic compounds of the 1,2-pyran series of the formula I (I) 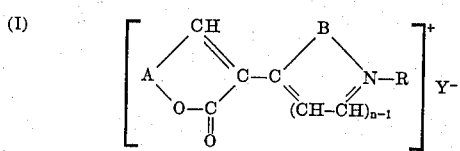

in which:
A represents a bivalent aromatic residue which is linked in the O-position and may, if desired, be substituted,
B represents a bivalent residue as hereinafter defined,
R represents an alkyl or aralkyl residue which, if desired, may be substituted,
$n$ is 1 or 2 and when $n$ is 2, B is a bivalent residue selected from the group consisting of vinylene or o-phenylene and when $n$ is 1, B is a bivalent residue selected from the group consisting of butadienylene or o-styrylene and B is unsubstituted or substituted by methyl or ethyl,
Y represents the equivalent charge of an anion,
wherein a thioacetiamide compound of the formula II (II) 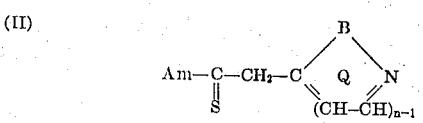

in which
Am represents a primary, secondary or tertiary amino group and
B and $n$ have the same meanings as in formula I
is converted with a reactive ester of an aliphatic or araliphatic alcohol with an inorganic or organic acid of the formula $$R - Y'$$

(III)

(in which R has the same meaning as in formula I and Y' represents the acid residue corresponding to the anion Y⁻) into a cycloammonium compound which latter compound is then reacted with an aromatic aldehyde, which contains a hydroxyl group in the orthoposition to the aldehyde group, to form a cationic coumarin compound of the formula I, and the starting materials are chosen so that the cationic portion of the final product does not contain any groups that undergo acid dissociation in water.

2. A process as claimed in claim 1, wherein a thioacetamide compound of the formula II is used in which Am represents a morpholino group.

3. A process as claimed in claim 1, wherein a thioacetamide compound of the formula II is used in which $n = 2$ and B represents a bivalent residue which completes the nitrogenous Q ring to a pyridine ring linked in the 4-position.

4. A process as claimed in claim 1, wherein a 2-hydroxybenzaldehyde compound is used which may be substituted in position 4 by a lower alkoxy, lower alkanolyamino, lower alkoxycarbonylamino group or by a primary, secondary or tertiary amino group.

5. A process as claimed in claim 1, wherein a 2-hydroxybenzaldehyde compound of the formula V (V) 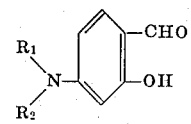

is used, in which
$R_1$ represents a lower, possibly substituted, alkyl group, a cycloalkyl group, a phenylalkyl group or a phenyl group,
$R_2$ represents a lower alkyl group, or
$R_1$ and $R_2$ together with the nitrogen atom form morpholino, pyrrolidino or piperidino.

6. A fluorescent cationic compound of the formula VII (VII) 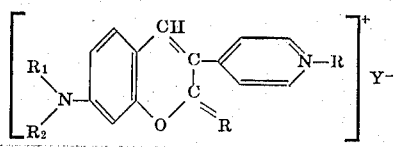

in which
R represents $C_1-C_4$-alkyl optionally substituted by cyano, $-CONH_2$, chloro, hydroxyl or ethoxycarbonyl; and benzyl;
Y represents the equivalent charge of an anion;
$R_1$ represents $C_1-C_4$-alkyl optionally substituted by chloro, bromo, cyano or hydroxy; cyclohexyl; and benzyl;
$R_2$ represents a $C_1-C_4$-alkyl;
$R_1$ and $R_2$ together with the nitrogen atom to which they are attached, form a morpholino, pyrrolidino, piperidino and N-methylpiperazino ring.

7. A fluorescent cationic compound of the formula VII as claimed in claim 6, in which R represents the methyl or ethyl group.

8. A fluorescent cationic compound as claimed in claim 6 of the formula

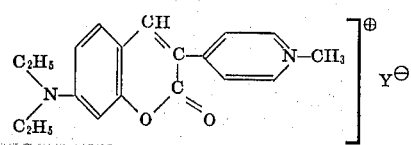

wherein Y has the meaning given in claim 6.

* * * * *